United States Patent [19]  
Dighton et al.

[11] Patent Number: 4,702,009  
[45] Date of Patent: Oct. 27, 1987

[54] DEVICE FOR MEASURING THE LEVEL OF A MATERIAL STORED IN A TANK

[75] Inventors: Gaylon L. Dighton; John W. Lewis, both of Baton Rouge, La.

[73] Assignee: The Dow Chemical Company, Midland, Mich.

[21] Appl. No.: 848,542

[22] Filed: Apr. 7, 1986

[51] Int. Cl.$^4$ .............................................. G01F 23/04
[52] U.S. Cl. .................................................. 33/126.6
[58] Field of Search ..................... 33/126, 126.4, 126.5, 33/126.6, 126.7 A

[56] References Cited

U.S. PATENT DOCUMENTS

| | | | |
|---|---|---|---|
| 1,888,605 | 11/1932 | Neely | 33/126.5 |
| 2,066,387 | 1/1937 | Bigelow et al. | 33/126.6 |
| 2,992,486 | 7/1961 | Ruth | 33/126.5 |

FOREIGN PATENT DOCUMENTS 1321540  2/1963  France ................................ 33/126.6

Primary Examiner—Harry N. Haroian  
Attorney, Agent, or Firm—V. Dean Clausen

[57] ABSTRACT

An indicator device is disclosed that is useful for measuring the level of a material stored in a tank. The device includes a stationary tubular section that fastens into the top wall of the tank. One or more tubular sections of smaller diameter are made to slide inside the stationary section to form a telescoping unit. The smallest tubular section has a foot member at its bottom end and a cable fastened to its upper end. The cable passes over a sheave and is wound onto a winch operated by a motor. In operation, the winch lowers the smallest tubular section into the tank until the foot member contacts the material in the tank and compresses the material enough to stop the downward movement of the tubular section. The winch is then reversed to bring the tubular section back to its "up" position. The sheave operates a counting and recording device that records the total distance traveled by the cable, and this distance indicates the level of material in the tank.

3 Claims, 6 Drawing Figures

1

DEVICE FOR MEASURING THE LEVEL OF A MATERIAL STORED IN A TANK

BACKGROUND OF THE INVENTION

The invention relates to an indicator device useful for measuring the level of a material stored in a tank.

In the manufacture of many industrial products, either solids or liquids, the product is temporarily stored in a tank before it is packaged or delivered to the user in some other form. A critical step in the manufacturing process is to be able to measure the amount of material in the tank at any given time. Conventional devices that may be used to measure the level of material in the tank include differential pressure (DP) cells, sonic devices, and plumb bobs. None of these devices are entirely satisfactory for measuring the level of a finely divided solid material inside a tank.

For example, it is very difficult to measure the level of finely divided solids, such as Methocel ® cellulose ether, when the material is stored in a tank. If a DP cell is used, the fine material tends to blind or clog the diaphragm and interfere with the reading. Plumb bobs are not suitable devices for measuring the level of solids stored in a tank because the bob may tear loose from its line and damage the screw conveyer and rotary valves located in the product discharge lines. Sonic devices for measuring the level of a material also have certain drawbacks, in that they may give false levels, depending on particle size of the solids and the angle of repose of the surface. Also, when a tank is being filled with a particulate solid from an air stream, the dense cloud of "dust" within the tank can give false sonic data.

The present invention overcomes most of the problems described above. In one embodiment of the invention, telescoping tubular sections are raised and lowered within a tank containing a stored material by a winch unit that includes a cable string. A foot member at the bottom end of the telescoping assembly makes contact with the material in the tank and a counting and recording device measures and records the total distance traveled by the cable to indicate the level of material in the tank.

SUMMARY OF THE INVENTION

This invention provides an indicator device useful for measuring the level of a material stored in a tank, such as a solid material, or a liquid phase substance. In one embodiment, which is best suited for measuring the level of a solid material in a tank, the device comprises a stationary tubular section and a telescopic tubular section. The stationary tubular section fastens into the top wall of the tank, so that the upper part of the section is positioned outside the tank above the top wall, and the lower part of the section is positioned inside the tank below the top wall. The telescopic tubular section depends from and is slidable within the stationary tubular section.

The lower end of the telescopic tubular section is defined by a foot member that includes a base portion having a flat surface, and the free end of a cable string is fastened to the upper end of this section. The other end of the cable string is wound onto the drum of an electric winch. At the top end of the stationary tubular section is a sheave that the cable string passes over. The sheave is mounted on a shaft that engages a counting device, which is, in turn, connected to a recorder device. In the practice of the invention, the winch is operated in a forward sequence to unwind the cable from a starting point and lower the foot member until it contacts the material in the tank, and compresses the material enough to stop the downward movement of the telescopic tubular section. Reversing the winch rewinds the cable to a starting point, and the counting and recording device measures and records the distance traveled by the cable string, first in the forward sequence, then in the reverse sequence, to indicate the level of material in the tank.

DESCRIPTION OF THE INVENTION

Figure 1:
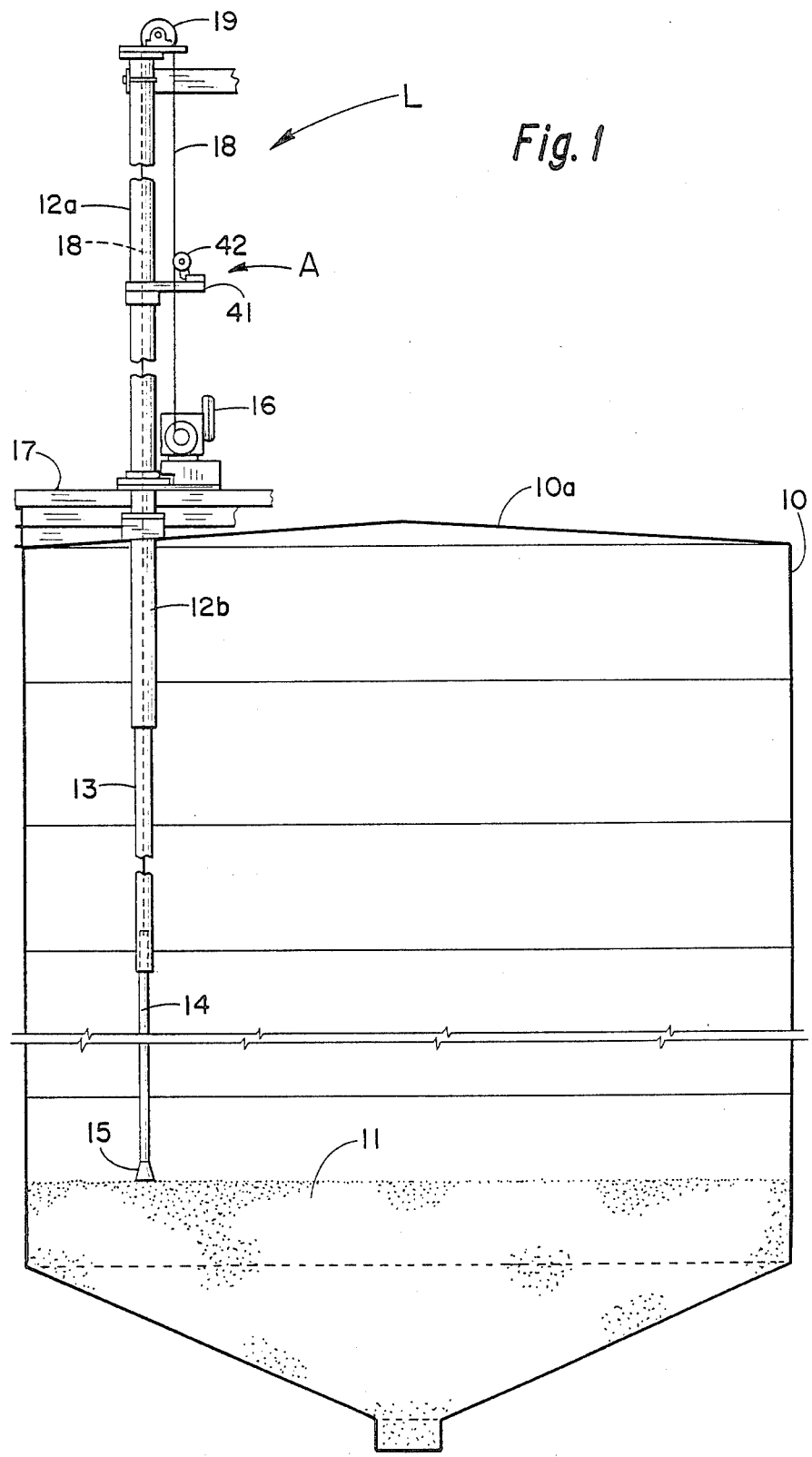
FIG. 1 is a front elevation view, mostly schematic, of one embodiment of the indicator device of this invention.

Referring to the drawings, particularly FIGS. 1-5, the indicator device of this invention is generally indicated by the letter L. As shown in FIG. 1, the present indicator device is especially designed for mounting on a tank 10, which is used for storing either a solid phase or a liquid phase material. In FIG. 1 the material stored in tank 10 is a solid material, as indicated by numeral 11.

In the practice of this invention, the basic indicator device includes a stationary tubular section and a telescopic unit having at least one tubular section that depends from and is slidable within the stationary tubular section. In the embodiment illustrated in FIGS. 1-5 the stationary tubular section has an upper part 12a and a lower part 12b. This section fastens into top wall 10a of tank 10, so that upper part 12a is outside the tank above the top wall, and lower part 12b is inside the tank below the top wall. The telescopic unit of this embodiment consists of two tubular sections, a first section 13, and a bottom section 14. Tubular section 13 has a smaller diameter than the stationary tubular section, so it can slide up and down in the stationary section, and the diameter of bottom section 14 is smaller than section 13, so that these sections are slidable one within the other.

Figure 2:
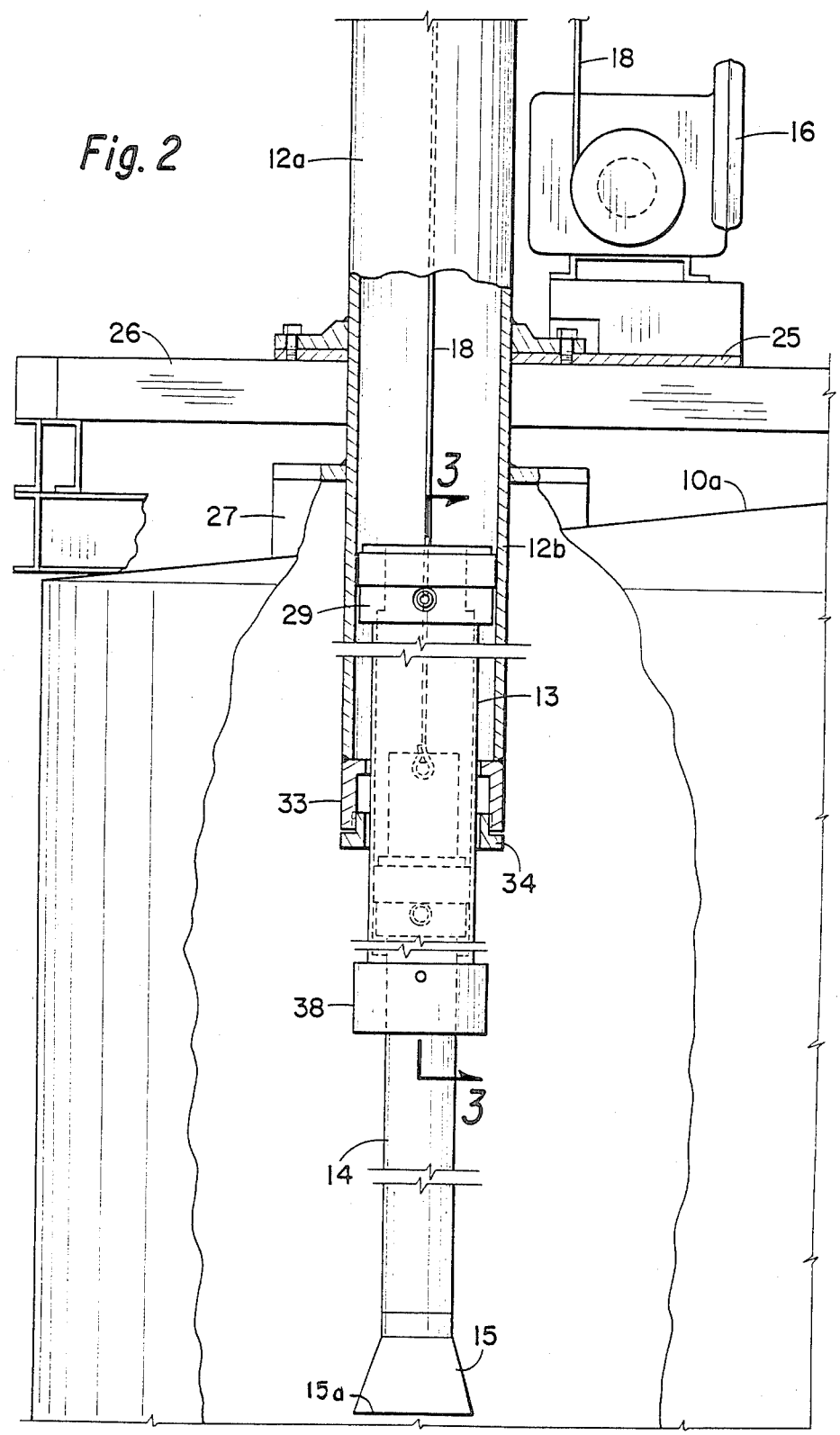
FIG. 2 is a fragmentary detail view, partly in section, of the indicator device shown in FIG. 1.

At the bottom end of section 14 is a foot member 15 having a frusto-conical shape, as best illustrated in FIG. 2. As the drawing shows, the base of foot member 15 has a flat surface 15a. A winch unit 16 is positioned adjacent to the stationary tubular section and is mounted on a beam 17 that lies above the top wall 10a of tank 10. The winch unit includes a cable string 18. The free end of the cable string passes over a sheave 19, extends down through the stationary tubular section, the first section 13, and fastens into the upper end of the bottom tubular section 14.

Figure 4:
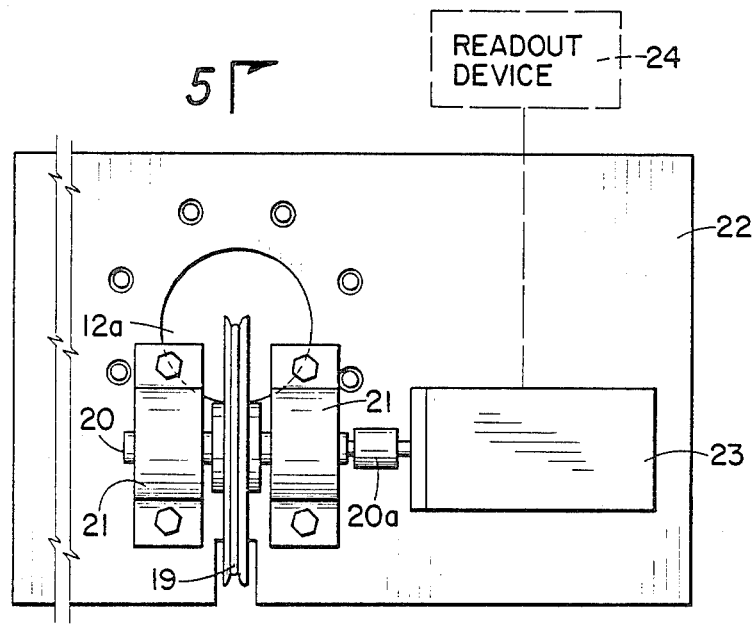
FIG. 4 is a plan view of the indicator device of FIG. 1. This view illustrates the counting and recording components that form a part of the indicator device of this invention.
Figure 5:
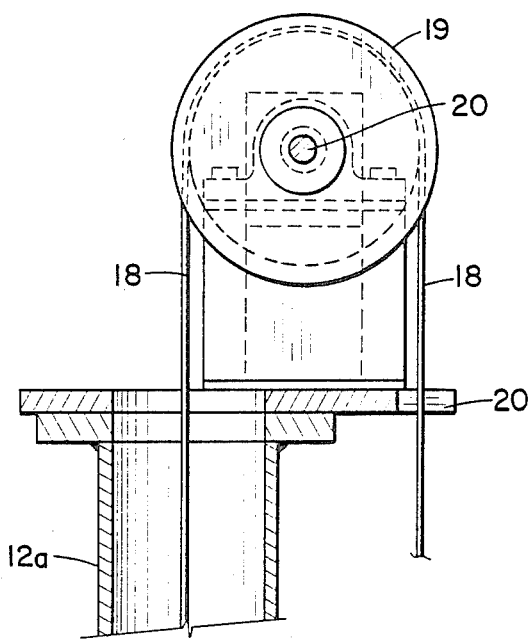
FIG. 5 is taken on line 5—5 of FIG. 4 and it illustrates another view of the counting and recording components of this invention.

As illustrated in FIGS. 4 and 5, the sheave 19 is mounted on a shaft 20 that is journaled in a pair of pillow blocks 21, and each block is mounted on a beam support 22. A pulse generator 23 is mounted on a support bracket (not shown) adjacent to sheave 19. The sheave shaft 20 is connected to the generator shaft by a coupling 20a. The generator 23 is connected into a readout device 24 that is positioned in a control room (not shown), or at some other desired location.

Figure 3:
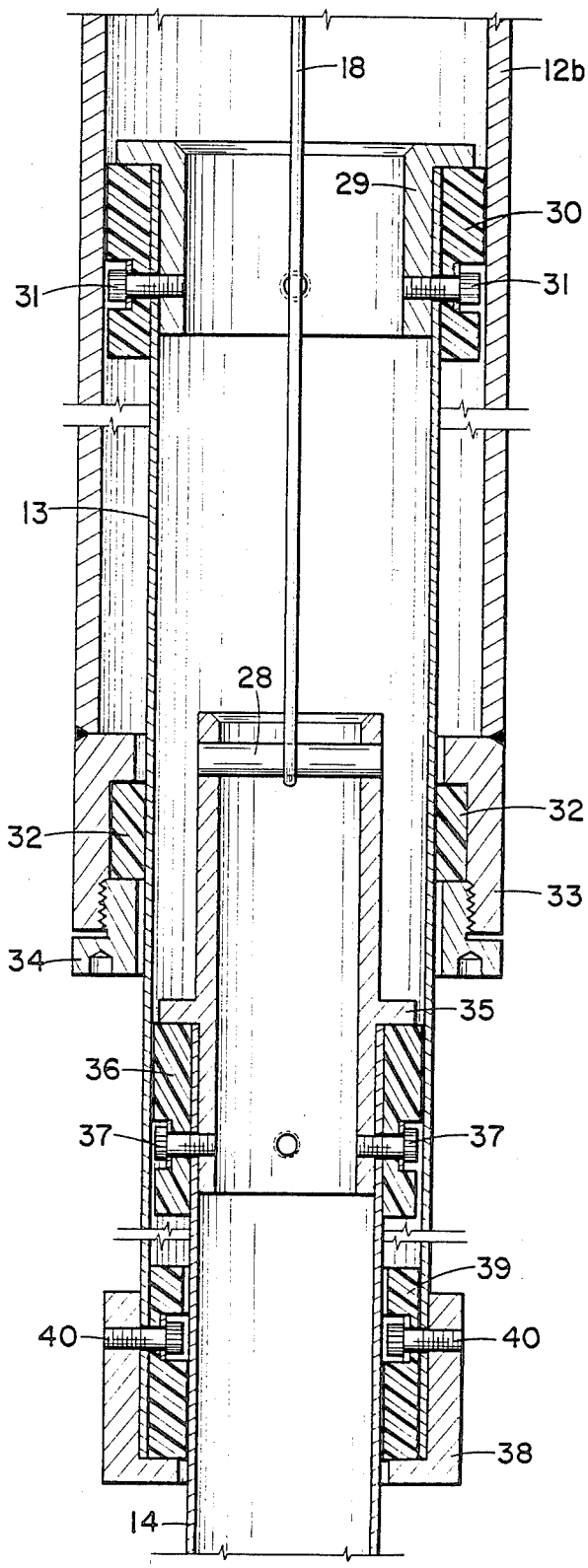
FIG. 3 is taken on line 3—3 of FIG. 2 and it illustrates another detail view of the indicator device of FIG. 1.

Referring particularly to FIGS. 2 and 3, the upper part 12a of the stationary tubular section is fastened to a plate 25 that is, in turn, mounted on a beam support 26. Below the beam 26 is a retainer housing 27 that is mounted on the top side of the tank wall 10a. The lower part 12b of the first tubular section extends through housing 27 into tank 10. As illustrated particularly in FIG. 3, the free end of the cable string 18 is fastened around a pin 28 that fits crosswise into the top end of the bottom tubular section 14.

A retainer member 29 is fitted down inside the top end of the tubular section 13. A bushing 30 is fitted over the top end of section 13 and it is anchored to the retainer 29 by cap screws 31. At the bottom end of the part 12b of the stationary tubular section is a bushing 32, which is held in place by housing member 33 and retainer nut 34. Just below the top end of the tubular section 14 is a shoulder 35, and a bushing 36 is fitted around the tubular section, such that the top edge of the bushing 36 is in contact with the underside of the shoulder. The bushing 36 is held in place by cap screws 37 that penetrate the bushing and the wall of the tubular section 14. A retainer member 38 is fitted over the bottom end of the tubular section 13 and bushing 39 is fitted inside the bottom end of this section. The bottom edge of bushing 39 seats against the top inside surface of retainer member 38 and the bushing is held in place by cap screws 40.

Operation

To illustrate the practice of this invention, a typical operation of the indicator device shown in FIGS. 1–5 will now be described. The readout device 24 is first set back to zero. Operation of the tubular sections which make up the telescoping assembly are controlled by an electronic control system (not shown). The control system starts a motor (not shown) that operates the winch unit 16; at the same time, a brake mechanism (not shown) holding the cable string 18 in place is released. Above the winch unit 16 is an idler arm unit, generally indicated by the letter A. This unit includes a support bracket 41, attached to the upper part 12a of the stationary tubular section, and a spring-loaded pulley 42, mounted on the bracket.

As indicated in FIG. 1, pulley 42 engages the cable string 18 and holds it taut while the cable is being unwound from the winch unit, or rewound on the winch unit. The electronic control system includes two limit switches. One of these switches controls operation of the idler arm unit A. The other switch controls operation of the motor for winch unit 16. The switches and winch motor are not shown in the drawing.

As the cable string 18 starts to unwind, the winch motor limit switch closes. The idler arm limit switch remains closed, because cable string 18 is taut, due to the weight of the assembly. Sheave 19 and its shaft 20 are rotated by the cable string 18 passing over it. The rotating shaft 20 drives the pulse generator 23. The cable string 18 continues to unwind until the flat surface 15a at the base of foot member 15, contacts the solid material 11 and compresses the material only enough to stop the downward movement of the bottom tubular section 14. At this point, the cable string slackens and the idler arm limit switch opens. At the same time, the winch motor stops and the cable string brake (not shown) is activated to hold the cable string 18 in place.

During the "downward" trip of foot member 15 into tank 10, sheave 19 makes a given number of revolutions. Each revolution of the sheave generates a certain number of pulses (in this case, 300 pulses) that are picked up by the pulse generator 23. Therefore, when sheave 19 is rotating, the readout device 24 accumulates the pulse data received from generator 23 and converts it to distance units (number of feet). When foot member 15 contacts the solid material 11, sheave 19 stops rotating, and the number displayed by the readout device 24 represents one-half of the distance (in feet) between the surface of the solid material and the bottom end of the lower part 12b of the stationary tubular section. The bottom end of part 12b serves as a reference point for the measurement, because the level of material 11 cannot be measured above this point.

After foot member 15 has been in contact with the solid material in the tank for a few seconds, a timer (not shown) in the electronic control system (not shown) reverses the winch motor and releases the cable string brake. As the cable string 18 begins to rewind and pull the tubular section 14 upwardly, tightening of the cable causes the idler arm switch to close. When tubular section 14 reaches the top limit of its travel, it causes the winch motor limit switch to open and stop the winch motor. When power to the winch motor is turned off, the cable string brake is again activated to hold the cable string in place.

During the "upward" trip of foot member 15, it travels approximately the same distance it did on the "downward" trip, which the readout device 24 accumulates as one-half the distance (in feet) between the surface of the solid material 11 and the bottom end of part 12b of the stationary tubular section. The readout device computes the total distance (in feet) that the foot member has traveled, and this figure is used to calculate the actual level of the solid material 11 in tank 10. The purpose in measuring the distance that the foot member travels in both the downward trip and the upward trip is to obtain a more precise measurement than would be possible by measuring the distance in one direction only.

Figure 6:
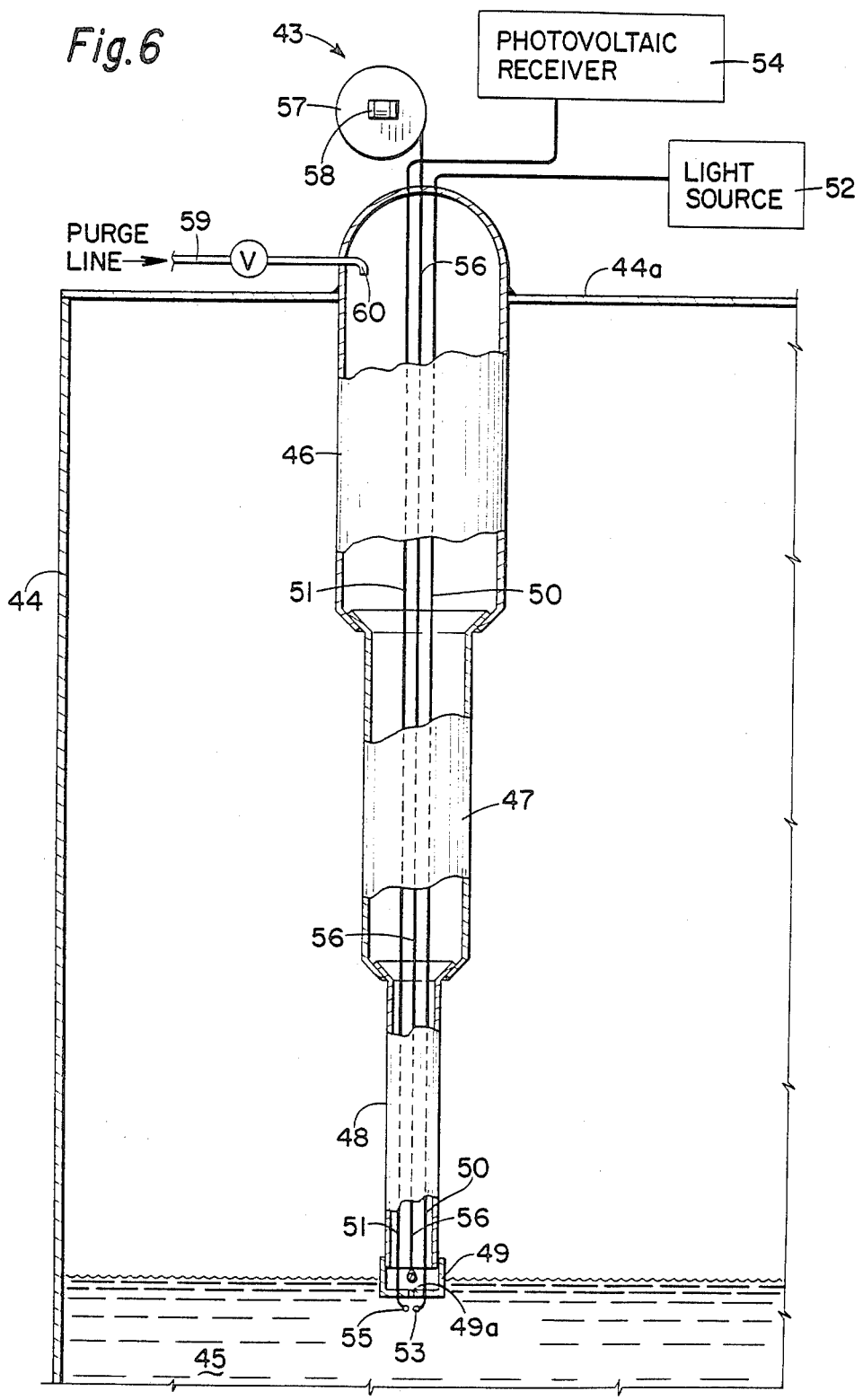
FIG. 6 is a schematic view of a second embodiment of the indicator device of this invention.

A second embodiment of the indicator device of this invention is illustrated in FIG. 6. This device is generally indicated by the number 43, and like the embodiment described earlier, it is especially designed for mounting on a tank 44. In actual practice this device may be used to measure the level of either a solid phase or a liquid phase material, which may be stored in the tank. For purposes of illustration, the material stored in the tank shown in FIG. 6 is a liquid phase material, as indicated by the numeral 45.

The practice of this invention is similar to the embodiment described earlier, in that the basic indicator device includes a stationary tubular section and a telescopic unit having at least one tubular section that depends from and is slidable within the stationary tubular section. In a specific embodiment, as shown in FIG. 6, the device 43 consists of a stationary tubular section 46, and a telescopic unit that includes two tubular sections, a first section 47, and a bottom section 48. The first tubular section 46 fastens into the top wall 44a of tank 44. The upper part of this section extends above the top wall of the tank and the lower part extends down into the tank.

Tubular section 47 is of a smaller diameter than the stationary section 46, so that it can slide up and down inside the stationary section. The bottom tubular section 48 has a smaller diameter than the section 47, so that it can slide up and down inside of section 47. A cap 49 fits over the bottom end of section 48 and the cap has a small opening therein, as indicated by numeral 49a. The indicator device includes a detector means, which consists of one light transmitter fiber optic strand 50 and one light receiver fiber optic strand 51. A light source 52 is located outside of tank 44 and is positioned adjacent to the tubular section 46.

One end of the light transmitter strand 50 is connected into the light source. From this point the strand runs lengthwise through each of the tubular sections and terminates in a free end 53 that is positioned just outside of cap 49. A light sensor means, such as a photovoltaic receiver 54, is also located outside of tank 44 and is positioned adjacent to the first tubular section 46. One end of the light receiver strand 51 is connected into the sensor means 54, and the strand runs lengthwise through each of the tubular sections and terminates in a free end 55 that is positioned outside of cap 49. As noted in the drawing, the free ends 53 and 55 of the strands are not joined, so that there is a small space between them.

The present indicator device also includes a cable string 56, that is wound onto a drum 57. The drum is positioned above the top end of the tubular section 46 and the cable runs lengthwise down through each of the tubular sections. At the lower end of the bottom tubular section 48 the free end of cable string 56 fastens into cap 49. Attached to the cable drum 57 is a device 58 for counting the number of revolutions made by the cable drum, starting from a given point.

In a typical operation of this indicator device, the cable drum 57 is operated in a forward sequence by an automatic control system (not shown) to unwind the cable string 56, and allow the tubular section 48 to move downwardly. When the tubular section 48 moves down far enough for the free ends 53 and 55 to become submerged in the liquid 45, the light beam sensed by receiver 54 will become blocked by the liquid. At this point the counting device 58 gives a readout that indicates the distance (in feet or some other units) that the cable string 56 has traveled from a given point, and this distance will correspond to the level of the liquid 45 in tank 44.

As shown in FIG. 6, a purge line 59 is installed in the top part of the tubular section 46. The outlet end 60 is positioned inside the tubular section 46; the opposite end (not shown) connects into a source of purge gas, such as nitrogen or compressed air. At the finish of each measuring operation, the tubular section 48 can be pulled up far enough to lift the cap 49 out of the liquid in tank 44. The free ends 53 and 55 of the fiber optics strands 50 and 51 can then be cleaned of any contaminating material by forcing the purge gas down through the tubular sections and out through the opening 49a in cap 49.

The invention claimed is:

1. An indicator device that measures the level of material in a tank, the tank has a top wall, the device comprises:
    a stationary tubular section that fastens to the top wall of the tank, it has a lower part positioned inside the tank below the top wall, and it has an upper part positioned outside the tank above the top wall;
    a telescopic tubular section that depends from and is slidable within the stationary tubular section, and the telescopic tubular section has a lower end defined by a cap having an opening therein;
    the indicator device includes a detector means consisting of one light transmitter fiber optic strand, and one light receiver fiber optic strand, and both of these strands run lengthwise through the stationary and telescopic tubular sections;
    the indicator device includes a source of light positioned adjacent to the stationary tubular section, one end of the light transmitter strand is connected into the source of light, and the opposite end of said strand is a free end that is positioned outside of the cap that defines the lower end of the telescopic tubular section;
    the indicator device includes a light sensor means, the sensor means is positioned adjacent to the stationary tubular section, one end of the light receiver strand is connected into the sensor means, the opposite end of said strand is a free end that is positioned outside of the cap at the lower end of the telescopic tubular section, and a space is defined between the free end of the light receiver strand and the free end of the light transmitter strand;
    the upper part of the stationary tubular section has a top end, a cable drum is positioned above the top end of the first tubular section, a cable string on the drum has a free end, the free end of the cable string passes down through the stationary and telescopic tubular sections, and fastens into the cap at the lower end of the telescopic tubular section;
    the indicator device includes a device for counting the number of revolutions made by the cable drum from a given point, and the counting device is attached to the cable drum;
    wherein, the cable drum is operated in a forward sequence, which unwinds the cable string from a starting point and lowers the telescopic tubular section until the free ends of the light transmitter and light receiver fiber optic strands are submerged below the surface of the material in the tank, the light received by the light sensor means is blocked, a reading is taken from the counting device to determine the distance traveled by the cable string from the starting point, and this distance indicates the level of the material in the tank.

2. An indicator device that measures the level of material in a tank, the tank has a top wall, the device comprises:
    a stationary tubular section that fastens to the top wall of the tank, it has a lower part positioned inside the tank below the top wall, and it has an upper part positioned outside the tank above the top wall;
    a telescopic unit defined by a number of tubular sections that are slidable one within another, the unit depends from and is slidable within the stationary tubular section, the unit includes a bottom tubular section that has an upper end and a lower end, the upper end includes means for fastening a cable string to the bottom tubular section, and the lower end is defined by a cap having an opening therein;
    the indicator device includes a detector means consisting of one light transmitter fiber optic strand, and one light receiver fiber optic strand, and both of these strands run lengthwise through the stationary tubular section and the tubular sections of the telescopic unit;

the indicator device includes a source of light positioned adjacent to the stationary tubular section, one end of the light transmitter strand is connected into the source of light, and the opposite end of said strand is a free end that is positioned outside of the cap that defines the lower end of the bottom tubular section;

the indicator device includes a light sensor means, the sensor means is positioned adjacent to the stationary tubular section, one end of the light receiver strand is connected into the sensor means, the opposite end of said strand is a free end that is positioned outside of the cap at the lower end of the bottom tubular section, and a space is defined between the free end of the light receiver strand and the free end of the light transmitter strand;

the upper part of the stationary tubular section has a top end, a cable drum is positioned above the top end of the stationary tubular section, a cable string on the drum has a free end, the free end of the cable string passes down through the stationary tubular section and the tubular sections of the telescopic unit, and fastens into the cap at the lower end of the bottom tubular section;

the indicator device includes a device for counting the number of revolutions made by the cable drum from a given point, and the counting device is attached to the cable drum;

wherein, the cable drum is operated in a forward sequence, which unwinds the cable string from a starting point and lowers the bottom tubular section until the free ends of the light transmitter and light receiver fiber optic strands are submerged below the surface of the material in the tank, the light received by the light sensor means is blocked, a reading is taken from the counting device to determine the distance traveled by the cable string from the starting point, and this distance indicates the level of the material in the tank.

3. The indicator device of claim 2 which further includes a purge line having an inlet end and a discharge end, the inlet end is connected into a source of purge gas, and the discharge end is positioned inside of the stationary tubular section;

wherein, a gas suitable for purging can be carried through the purge line, then passed downwardly through the respective tubular sections and out through the opening in the cap at the lower end of the bottom tubular section, to remove any material that may accumulate between the free ends of the light transmitter and the light receiver fiber optic strands.

* * * * *